United States Patent
Tunestal

(10) Patent No.: US 7,974,762 B2
(45) Date of Patent: Jul. 5, 2011

(54) SELF TUNING CYLINDER PRESSURE BASED HEAT RELEASE COMPUTATION

(75) Inventor: Per Tunestal, Malmo (SE)

(73) Assignee: Volvo Powertrain AB, Gothenburg (SE)

( * ) Notice: Subject to any disclaimer, the term of this patent is extended or adjusted under 35 U.S.C. 154(b) by 95 days.

(21) Appl. No.: 12/525,452

(22) PCT Filed: Dec. 19, 2007

(86) PCT No.: PCT/EP2007/064260
§ 371 (c)(1),
(2), (4) Date: Sep. 25, 2009

(87) PCT Pub. No.: WO2008/095569
PCT Pub. Date: Aug. 14, 2008

(65) Prior Publication Data
US 2010/0004845 A1 Jan. 7, 2010

(30) Foreign Application Priority Data
Feb. 7, 2007 (SE) .................................. 0700299

(51) Int. Cl.
*G06F 19/00* (2011.01)
(52) U.S. Cl. ................................. 701/101; 123/435
(58) Field of Classification Search .............. 701/101, 701/103–105, 110–114; 123/434, 435, 406.22, 123/406.41, 406.43
See application file for complete search history.

(56) References Cited

U.S. PATENT DOCUMENTS

| 4,621,603 | A | * | 11/1986 | Matekunas | 123/435 |
| 4,622,939 | A | * | 11/1986 | Matekunas | 123/406.41 |
| 4,624,229 | A | * | 11/1986 | Matekunas | 123/406.41 |
| 7,073,485 | B2 | * | 7/2006 | Truscott et al. | 123/406.22 |
| 7,117,080 | B2 | * | 10/2006 | Sobel | 701/114 |

FOREIGN PATENT DOCUMENTS
DE   102004048319   4/2006
DE   102005021528   7/2006

OTHER PUBLICATIONS

H.G. Von Garssen and V. Magori, A method-based sensor for the adaptation of internal combustion engines, journal, Apr. 1, 1994, pp. 207-211, A41, Lausanne, CH.
Per Tunestal, J. Karl Hedrick and Rolf Johansson, Model-Based Estimation of Cylinder Pressure Sensor Offset using Least-Squares Methods, journal, Dec. 2001, pp. 3740-3745, Orlando, Florida.

* cited by examiner

*Primary Examiner* — John T Kwon
(74) *Attorney, Agent, or Firm* — Black Lowe & Graham PLLC

(57) ABSTRACT

A method for automatic, heat release computation in a piston engine, comprises the steps of: measuring a cylinder pressure as a function of crank angle (see FIGURE), based on said measurement; calculating a first polytropic exponent for a compression stroke (in M), based on said measurement, calculating a second polytropic exponent for an expansion stroke (in M'); for a crank angle interval between the compression stroke and the expansion stroke, performing an interpolation of the first and second polytropic exponents and performing a net heat release computation based on said interpolated polytropic exponent.

6 Claims, 1 Drawing Sheet though and the fuel and air ignites. The HCCI engine differs from a spark ignition engine in that no ignition takes place; the engine is compressed until the charge self-ignites.

SELF TUNING CYLINDER PRESSURE BASED HEAT RELEASE COMPUTATION

PRIORITY CLAIM

This application is a national phase of PCT/EP2007/064260 filed Dec. 19, 2007, which claims priority to Swedish Application Serial No. 0700299-1 filed Feb. 7, 2007, the contents of which are hereby incorporated by reference.

FIELD OF THE INVENTION

The present invention relates to a method for computing heat release rate in a piston engine,

PRIOR ART

In piston engine research, the heat release rate has for a long time been a very important diagnostics tool. In order to measure the heat release rate, the standard procedure has basically been to motor the engine, measure the pressure in the cylinder as a function of crank angle position and obtain a so-called "motored" pressure trace, and thereafter ignite the engine and record a "fired" pressure trace. The difference between the motored pressure trace and the fired pressure trace can be used to determine which pressure effects that emanate from the combustion, i.e. the heat release.

The described method provided a very accurate result, but is unfortunately very labor intensive; in order to get a good result, several different loss effects, such as heat transfer to cylinder walls, leakage of gas, crevice volumes and so on, must be taken into account.

The recent years, onboard diagnostics systems have become a vital tool for enabling manufacturers of cars and lorries to monitor engine parameters, and in a foreseeable future, it might be desired to monitor heat release rate of the engine cylinders; by monitoring the rate of heat release, it might be possible to optimize engine operating parameters, e.g. ignition timing, fuel injection timing and fuel injection mount to provide an as efficient and environmentally friendly combustion as possible.

As mentioned above, it has hitherto been very labor intensive to achieve a heat release analysis, and the values for heat transfer, leakage and crevice volume might differ as the engine gets older and worn; hence, the known methods for obtaining a heat release analysis are not well suited for an onboard diagnostics system.

It is the object of the present invention to provide a method for performing a heat release computation. The method allows for a rapid calculation of heat release, it is "self-tuning", i.e. compensates for differences in heat transfer to cylinder walls, leakage, and crevice volumes, and it can be used with both pressure transducers providing absolute pressure and pressure transducers providing pressure changes.

SUMMARY OF THE INVENTION

The present invention solves the above problems by providing a method comprising the steps of:
1. measuring a cylinder pressure as a function of crank angle,
2. based on said measurement, calculating a first polytropic exponent for a compression stroke,
3. based on said measurement, calculating a second polytropic exponent for an expansion stroke,
4. for a crank angle interval between the compression stroke and the expansion stroke, performing an interpolation of the first and second polytropic exponents and
5. performing a net heat release computation based on said interpolated polytropic exponent.

If a pressure sensor used to monitor the cylinder pressure should be a sensor without an absolute pressure scale, a further step of calculating a pressure sensor offset could be included. The pressure offset could be estimated by using said polytropic exponents on the polytropic relation between pressure and volume.

In order to obtain an as simple and efficient interpolation as possible, the interpolation could be a linear interpolation. In another embodiment, the interpolation could be a cubic spline interpolation.

It is beneficial if the steps (2) and (3) comprise the steps of:
i. Setting an initial value of the polytropic exponent,
ii. Calculating a model pressure trace based on the initial value of the polytropic exponent,
iii. Calculating a model mismatch for each crank angle,
iv. Calculating a derivative with respect to the polytropic exponent of the sum of squared mismatches,
v. Based on the outcome of the previous step, increasing or decreasing the polytropic exponent by a predetermined amount,
vi. Reiterate steps ii to iv with the decreased or increased value of the polytropic exponent,
vii. Calculate a second derivative with respect to polytropic exponent of the sum of squared mismatches,
viii. Change value of the polytropic exponents by an amount corresponding to the derivative divided by the second derivative with a negative sign, and
ix. Repeat steps ii, iii, iv, vii and viii until the amount corresponding to the absolute value of the derivative divided by the second derivative is smaller than a predetermined value.

BRIEF DESCRIPTION OF THE DRAWINGS

In the following, the invention will be described with reference to the only drawing, FIG. 1, which shows a graph representing a pressure trace for the compression/expansion strokes of an HCCI engine.

DESCRIPTION OF EMBODIMENTS

Figure 1:
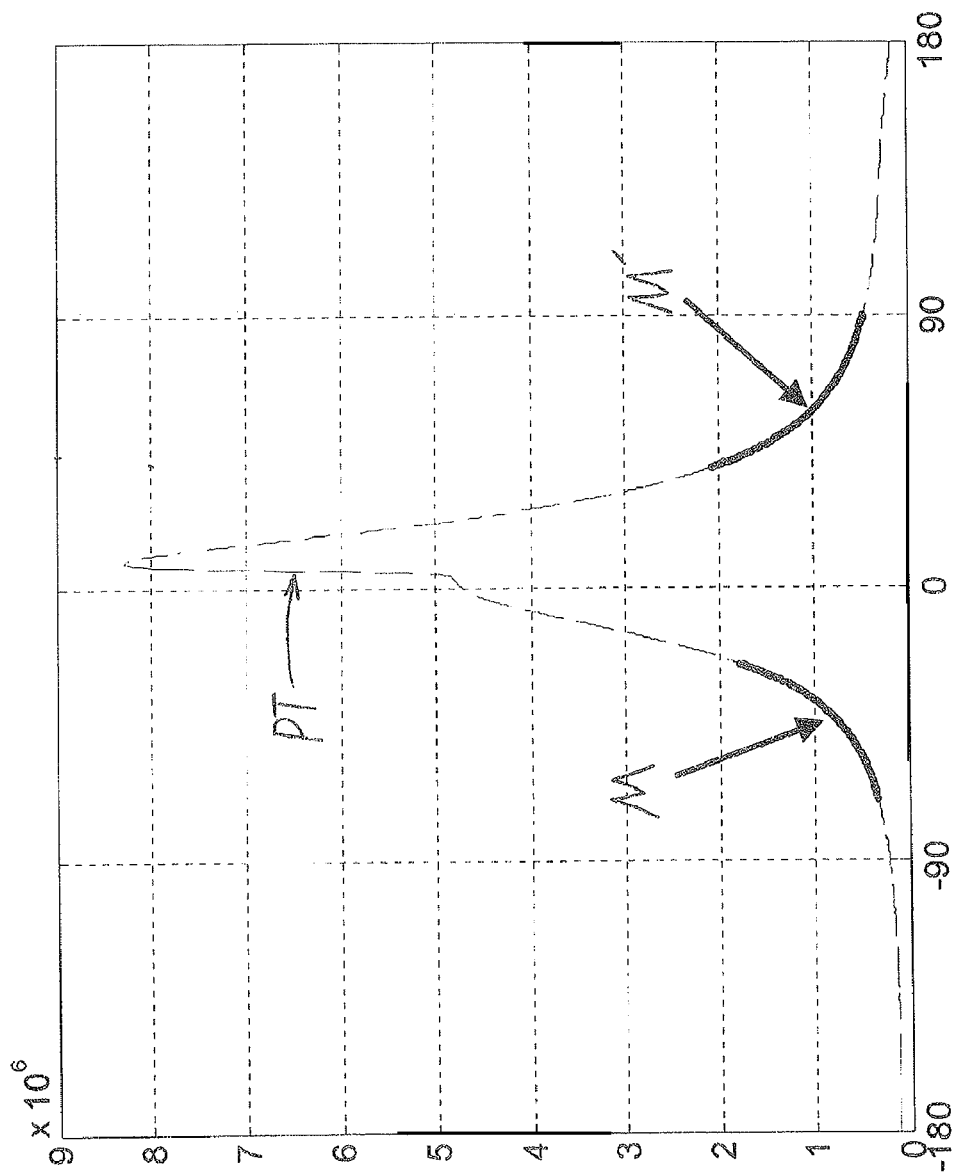

FIG. 1 shows a graph representing a pressure trace PT, showing the cylinder pressure as a function of crank angle in a piston engine. The graph shows the cylinder pressure for one engine revolution, i.e. piston positions from −180 crank angle degrees, CAD, (which equals Bottom Dead Centre, or BDC), to 0 CAD (which equals top dead center, TDC) and further on to 180 CAD, which also equals BDC.

As mentioned, the pressure trace shows the cylinder pressure for one revolution, and that is the revolution involving the combustion of the charge in the cylinder (the other revolution in a four-stroke engine is devoted to gas exchange). Some significant events can be seen in the pressure trace From −180 to 0 CAD, a compression of the charge takes place; the pressure rise in the cylinder emanates from the decrease of volume. In an ideal case, the pressure rise would follow the ideal gas law, but heat transfer to or from the cylinder walls and leakage of gas from the cylinder volume will offset the pressure trace.

The pressure trace PT is recorded in a so called HCCI engine, i.e. an engine inducting a mixture of fuel and air (like a spark ignition engine), which is compressed until the charge autoignites (like a diesel engine). The principles behind HCCI engines have been described in a number of technical papers (see e.g. Onishi et al, "Active Thermo-Atmosphere Combustion (ATAC)—A New Combustion Process for Internal Combustion Engines", SAE Paper 790501, Najt and Foster, "Compression-Ignited Homogeneous Charge Combustion", SAE Paper 830264, Thring, "Homogeneous-Charge Compression-Ignition (HCCI) Engines", SAE Paper 892068 and Olsson et al, "A Turbo-Charged Dual-Fuel HCCI Engine", SAE Paper 2001-01-1896) and patents, e.g. U.S. Pat. No. 6,286,482.

As can be seen in FIG. 1, the pressure trace PT makes a steep rise just after TDC, i.e. at 0 CAD. This pressure rise is due to the combustion; if no combustion would take place, the pressure would instead decrease after TDC. After the pressure peak, the pressure will decrease; this decrease is due to the increase in volume that emanates from the piston moving in a direction increasing the volume in which the gas is contained.

As mentioned in the preamble, the most common (and accurate) method for performing a heat release analysis is to compare a "fired" and a "motored" pressure trace, i.e. a pressure trace obtained in an engine being motored without any combustion, and an engine being operated with combustion. Assuming all other criteria are equal, it can be estimated that all differences in the pressure traces between the fired pressure trace and the motored pressure trace are due to combustion. Applying well established physical laws makes it possible to deduce the rate of combustion, i.e. the heat release.

The present invention relates to a method for enabling a heat release calculation without the need for motoring the engine and get a "motored" pressure trace to compare with. The following basic assumptions are made:

The thermal energy released by the combustion is treated as heat, and the only work interaction with the environment is through the work performed by the piston as it travels from 0 CAD to 180 CAD (i.e. from TDC to BDC). This can be expressed by the equation $$dU=dQ-dW,$$

Wherein
dU is change of internal energy,
dQ is heat transfer and
dW is mechanical work performed by the gas in the combustion chamber.

By substituting the change of internal energy, i.e. dU by the ideal gas expression, it can be determined that $$dQ=nCvdT+pdV,$$

Wherein
n is the number of moles trapped inside the cylinder,
Cv is heat capacity at a constant volume,
dT is change of temperature,
p is pressure and
dV is change of volume.

The ideal gas law can be used to express dT, i.e. the temperature change, in terms of pressure and volume; by substituting dT in the above equation, $$dQ = \frac{c_v}{R}d(pV) + pdV \quad (1)$$

Wherein
R is the universal gas constant.

As can be understood, dQ can be assumed to be zero, provided that there is no combustion or heat transfer between the walls and the cylinder charge; in a prior art heat release calculation, one must assume a value of the heat transfer, otherwise the heat release calculation will be inaccurate.

According to the invention, however, no assumption of the heat transfer is made; instead, the heat transfer is corrected for by a correction of Cv.

The method according to the invention involves a "correction" of Cv before and after the combustion (the heat losses are of course larger after the combustion, since the temperature of the charge is higher). During the combustion, the value of Cv is interpolated. The following equations (2-3) are only valid under the assumption that dQ=0. In order to facilitate, equation (1) is rewritten to:

$$0 = \left(\frac{c_v}{R} + 1\right)pdV + \frac{c_v}{R}Vdp \quad (2)$$
$$= \frac{\gamma}{\gamma-1}pdV + \frac{1}{\gamma-1}Vdp$$

Wherein $\gamma=Cp/Cv$ (Cp=heat capacity at constant pressure).

Dropping the denominators and combining the two differentials in (2) gives the polytropic relation $$d(pV^\gamma)=0 \quad (3)$$

Thus, when dQ is zero (which equals no combustion and no heat transfer), $pV^\gamma$ is constant.

In some cases, pressure transducers having unknown pressure levels are used for performing the in cylinder pressure measurements; this means that the pressure level must be identified. For this purpose, the measured pressure ($P_m$) can be expressed as $$Pm=p+\Delta p, \quad (4)$$

wherein p is the actual pressure and $\Delta p$ is the pressure offset.

Integration of (3) and application of (4) yields the equation used for identification of the pressure offset. (Please note that this step is unnecessary if a pressure transducer having a known pressure offset is used). Please note that K is used instead of $\gamma$ in the following equations; $\gamma$ is an accepted symbol for the actual ratio between Cp and Cv, and the following equations do not provide the actual ratio between Cp and Cv. Rather, the following equations give a polytropic exponent of a curve being fitted to the actual measured cylinder pressures. The equation for identifying the pressure offset is then $$(p_m-\Delta_p)V^K=(p_{m0}-\Delta_p)V_0^K \quad (5)$$

Wherein
K is the polytropic exponent, $p_m0$ is the measured pressure at a reference crank position and
$V_0$ is the volume of said reference crank position.

In order to reduce the influence of pressure measurement noise, it could be beneficial if the reference crank positions are selected to be as close to the TDC as possible; it is however crucial that the reference crank positions are selected on crank positions where no combustion takes place.

In order to remove the physical dimensions, (5) is rewritten to $$\frac{p_m}{p_{m0}} - \left(\frac{V_0}{V}\right)^K = \left[1 - \left(\frac{V_0}{V}\right)^K\right]\frac{\Delta p}{p_{m0}} \quad (6)$$

(6) can be expressed as $$y(\kappa) = \varphi(\kappa)\theta \quad (7)$$

wherein $$y(\kappa) = \frac{p_m}{p_{m0}} - \left(\frac{V_0}{V}\right)^\kappa, \quad (8)$$

$$\varphi(\kappa) = 1 - \left(\frac{V_0}{V}\right)^\kappa,$$

$$\theta = \frac{\Delta p}{p_{mo}}$$

Equation (7) is on a form allowing for the Newton non-linear least squares algorithm method (presented in "Estimation of the in-cylinder air/fuel ratio of an internal combustion engine by the use of pressure sensors", PhD thesis by Per Tunestal, Lund university, Faculty of engineering, 2001), the only difference being the K dependence of the output, i.e. y.

It will now be shown how the algorithm can be amended to accommodate this dependence; the same notation is adopted with the vector of crank angle resolved outputs and regressors given by:

$$Y = \begin{pmatrix} y_1 \\ \vdots \\ y_n \end{pmatrix}, \Phi = \begin{pmatrix} \varphi_1 \\ \vdots \\ \varphi_n \end{pmatrix} \quad (9)$$

Wherein
$y_i \ldots y_n$ are calculated values of y (see equation (8)) for an equidistant array of crank angle positions,
$\phi_1 \ldots \phi_n$ are calculated values of $\phi$ (see equation (8)) for the same equidistant array of crank angle positions.
This gives the vector equation $$Y = \Phi\theta \quad (10)$$

The vector of residuals is defined by $$D = Y - \Phi\theta$$

And a loss function is defined by $$J = D^T D,$$

Wherein $D^T$ is the transpose matrix of D; hence, J is a scalar.

In "Estimation of the in-cylinder air/fuel ratio of an internal combustion engine by the use of pressure sensors", PhD thesis by Per Tunestal, Lund university, Faculty of engineering, 2001, it is shown that $$j = Y^T P Y, \quad (11)$$

Wherein $$D = PY \text{ and}$$

P is a symmetric projection matrix described by $$I - \Phi(\Phi^T\Phi)^{-1}\Phi^T.$$

As well known by persons skilled in the art, the finite difference method requires an analytic expression for the derivative of J with respect to κ

This can be obtained by differentiating equation (10) with respect to κ, keeping in mind that both Y and P are functions of κ and using the fact that P is a symmetric matrix.

$$\frac{dJ}{d\kappa} = Y^T \frac{dP}{d\kappa} Y + 2Y^T P \frac{dY}{d\kappa}$$

The first term is evaluated in "Estimation of the in-cylinder air/fuel ratio of an internal combustion engine by the use of pressure sensors", PhD thesis by Per Tunetal, Lund university, Faculty of engineering, 2001, as $$Y^T \frac{dP}{d\kappa} Y = 2D^T \frac{d\Phi}{d\kappa} \theta$$

While the second term can be rewritten using the expression for the residuals in (11).

The derivative with respect to κ of the sum of squared mismatches J can thus be rewritten as $$\frac{dJ}{d\kappa} = 2D^T \left(\frac{dY}{d\kappa} - \frac{d\Phi}{d\kappa}\theta\right), \quad (12)$$

Wherein the elements of dY/dκ and dθ/dκ can be expressed as $$\frac{dy}{d\kappa} = \frac{d\varphi}{d\kappa} = -\left(\frac{V_0}{V}\right)^\kappa \ln\left(\frac{V_0}{V}\right)$$

With an analytic expression of dJ/dκ, the finite difference Newton method can be applied to minimize the loss function. The method features superlinear convergence; in practice, this means convergence in a few iterations. Iteration k is defined by $$H_\kappa = \frac{\frac{dJ}{d\kappa}(\kappa_\kappa) - \frac{dJ}{d\kappa}(\kappa_\kappa - 1)}{\delta_{\kappa-1}}$$

$$\delta_\kappa = \frac{\frac{dJ}{d\kappa}(\kappa_\kappa)}{H_\kappa}$$

$$\kappa_{\kappa+1} = \kappa_\kappa + \delta_\kappa$$

Wherein $H_k$ is the finite difference approximation of $d^2J/d\kappa^2$ at iteration k.

As could be understood, the crank positions between which the κ value is calculated must be chosen such that it is absolutely certain that no combustion takes place; in an SI engine (i.e. spark ignition engine), the start of combustion will not be earlier than the spark timing and for a CI engine (i.e. compression ignition, or diesel, engine), start of combustion will be after the first injection of fuel.

In FIG. 1, the crank positions corresponding to thicker portions M and M' of the pressure trace have been used to calculate the κ values before and after combustion, respectively; as can be seen, these crank positions are located on a "safe" distance from the combustion timing. It is, however, crucial not to choose crank intervals lying too far from the combustion event, since the κ value then will differ too much from the κ values at hand during the combustion (as can be understood, the influence of heat transfer during compression and expansion resembles the influence of heat transfer during combustion more the closer the investigated crank positions are to the combustion) It can be noted that the above mentioned reference crank positions should be located within the crank positions M and M'. It should also be noted that the portions M and M' preferably should be located in the "bent" portions of the pressure trace PT; as well known by persons skilled in the art, an exponent fitting operation is most accurate if the trace which it should be fitted to exhibits a curve.

As could be understood from the above equations, the method according to the invention needs some input values for κ, otherwise, the method will not work. In a preferred embodiment of the invention, the initial value of κ is set to 1.3, since experience shows that the κ value will range from about 1.2 to 1.4. (for pure air, γ, i.e. the actual thermodynamically correct isentropic exponent, is close to 1.4). The method will however work with any reasonably well chosen initial value of κ, but for a badly chosen value, the number of iterations necessary for obtaining a proper result will be larger.

The first and second iterations differ somewhat from the consecutive iterations. As mentioned, the first derivative of the error (i.e. J in equation 10) can be obtained analytically (equation 12), but for the second derivative, results from two consecutive cycles must be compared. As defined in the last equation above, namely $\kappa_{k+1}=\kappa_k+\delta_k$, the new value of κ for a following iteration is the negative derivative of the error with respect to κ divided by the second derivative of J with respect to κ; however, before the first iteration, there is no value for the second derivative. In order to solve this problem, during the first iteration (when the error and the derivative of the error have been calculated), the value of κ is altered by a predetermined amount, with direction determined by the sign of the first derivative of J with respect to κ.

This gives the iteration criteria as follows:

For the first iteration, a predetermined value of κ is set. In a preferred embodiment of the invention, this value is set to 1.3, but it can be set to any value, for example ranging from 1 to 2. During the first iteration, the first derivative of the error (i.e. J) can be calculated, and depending on the sign of the first derivative, the value of κ is increased or decreased by a predetermined amount, e.g. 0.01.

For the second and following iterations, it is possible to increase or decrease the κ value by the negative of the first derivative divided by the second derivative.

Finally, some words should be mentioned about the interpolation of the κ value between the two crank positions corresponding to the thicker portions M and M'. This interpolation could of course be a linear interpolation, but any type of interpolation could be used; an interpolation method probably giving a better result is a "cubic spline interpolation".

The heat release is calculated by substituting the isentropic exponent γ in the well-known heat release equation by κ. This gives the modified heat release equation:

$$dQ = \frac{\kappa}{\kappa-1}pdV + \frac{1}{\kappa-1}Vdp$$

Above, some embodiments of the present invention have been described. This description is however not intended to limit the scope of the invention; instead, the scope of invention is defined in the appended claims.

The embodiments of the invention in which an exclusive property or privilege is claimed are defined as follows:

1. A method for automatic heat release computation in a piston engine, comprising the steps of:
   a. measuring a cylinder pressure as a function of crank angle,
   b. based on said measurement, calculating a first polytropic exponent for a compression stroke,
   c. based on said measurement, calculating a second polytropic exponent for an expansion stroke,
   d. for a crank angle interval between the compression stroke and the expansion stroke, performing an interpolation of the first and second polytropic exponents and
   e. performing a net heat release computation based on said interpolated polytropic exponent.

2. The method of claim 1, comprising the further step of calculating a pressure sensor offset.

3. The method of claim 2, wherein the pressure sensor offset is estimated by using said polytropic exponents on the polytropic relation between pressure and volume.

4. The method of claim 1, wherein the interpolation is a linear interpolation.

5. The method of claim 1, wherein the interpolation is a cubic spline interpolation.

6. The method of claim 1, wherein steps (b) and (c) comprise the steps of:
   j. Setting an initial value of the polytropic exponent,
   ii. Calculating a model pressure trace based on the initial value of the polytropic exponent, iii. Calculating a model mismatch for each crank angle
   iv. Calculating a derivative with respect to the polytropic exponent of the sum of squared mismatches, v. Based on the outcome of the previous step, increasing or decreasing the polytropic exponent by a predetermined 5 amount,
   vi. Reiterate steps ii to iv with the decreased or increased value of the polytropic exponent,
   vii. Calculate a second derivative with respect to polytropic exponent of the sum of squared mismatches, 10
   viii. Change value of the polytropic exponents by an amount corresponding to the derivative divided by the second derivative with a negative sign, and
   ix. Repeat steps ii, iii, iv, vii and viii until the amount corresponding to the absolute value of the derivative 15 divided by the second derivative with a negative sign is smaller than a predetermined value.

* * * * *